(12) United States Patent
Hannington et al.

(10) Patent No.: US 12,298,541 B2
(45) Date of Patent: May 13, 2025

(54) RETROREFLECTIVE FILMS COMPRISING FLUORESCENT DYES

(71) Applicant: Avery Dennison Corporation, Glendale, CA (US)

(72) Inventors: Michael E. Hannington, Madison, OH (US); Nipa Joshi, Schaumburg, IL (US); Guang-Xue Wei, Buffalo Grove, IL (US)

(73) Assignee: Avery Dennison Corporation, Mentor, OH (US)

( * ) Notice: Subject to any disclaimer, the term of this patent is extended or adjusted under 35 U.S.C. 154(b) by 634 days.

(21) Appl. No.: 17/632,307

(22) PCT Filed: Jul. 16, 2020

(86) PCT No.: PCT/US2020/042216
§ 371 (c)(1),
(2) Date: Feb. 2, 2022

(87) PCT Pub. No.: WO2021/025838
PCT Pub. Date: Feb. 11, 2021

(65) Prior Publication Data
US 2022/0291428 A1    Sep. 15, 2022

Related U.S. Application Data

(60) Provisional application No. 62/882,647, filed on Aug. 5, 2019.

(51) Int. Cl.
*G02B 5/124* (2006.01)
*G02B 1/10* (2015.01)

(52) U.S. Cl.
CPC .............. *G02B 5/124* (2013.01); *G02B 1/10* (2013.01)

(58) Field of Classification Search
None
See application file for complete search history.

(56) References Cited

U.S. PATENT DOCUMENTS

| | | |
|---|---|---|
| 3,830,682 A | 8/1974 | Rowland |
| 5,122,902 A | 6/1992 | Benson |

(Continued)

FOREIGN PATENT DOCUMENTS

| | | |
|---|---|---|
| CN | 1400259 | 3/2003 |
| CN | 1649731 | 8/2005 |

(Continued)

OTHER PUBLICATIONS

International Search Report and Written Opinion dated Oct. 12, 2020 issued in corresponding IA No. PCT/US2020/042216 filed Jul. 16, 2020.

(Continued)

*Primary Examiner* — Jyotsna V Dabbi

(57) ABSTRACT

Provided herein is a retroreflective film comprising one or more layers (or coating layers) including a small quantity of fluorescent dye that shifts color readings (e.g., chromaticity coordinates) in specific regions located within a color space to comply with industry standards (e.g., United States, Europe, China and Brazil) while improving luminance factor and maintaining retroreflectivity. The one or more layers (or coating layers) of the retroreflective film includes a fluorescent dye from 0.0001 wt. % to 0.05 wt. %, based on the total weight of the layer, and exhibits a color reading that is situated in the color space defined by CIE chromaticity coordinates (0.305, 0.315), (0.335, 0.345), (0.325, 0.355) and (0.295, 0.325). The retroreflective film also achieves a good balance of high luminance and retroreflectivity.

25 Claims, 6 Drawing Sheets

(56) References Cited

U.S. PATENT DOCUMENTS

| | | |
|---|---|---|
| 5,387,458 A | 2/1995 | Pavelka et al. |
| 5,674,622 A * | 10/1997 | Burns ................ C08K 5/0041 359/581 |
| 5,920,429 A | 7/1999 | Burns et al. |
| 6,001,936 A | 12/1999 | Barrera et al. |
| 6,155,689 A | 12/2000 | Smith |
| 6,514,594 B1 | 2/2003 | Wei et al. |
| 6,531,205 B1 | 3/2003 | Buoni et al. |
| 6,972,147 B1 | 12/2005 | Wei et al. |
| 7,396,579 B2 * | 7/2008 | Owusu ................ G02B 5/124 359/530 |
| 7,445,347 B2 | 11/2008 | Couzin |
| 7,618,710 B2 | 11/2009 | Wei et al. |
| 7,674,515 B2 | 3/2010 | Wel |
| 8,322,868 B2 | 12/2012 | Wei |
| 2003/0052307 A1 | 3/2003 | Kinno |
| 2003/0189838 A1 | 10/2003 | Schottland et al. |
| 2003/0203211 A1 * | 10/2003 | Wei ........................ G02B 5/128 428/412 |
| 2004/0227997 A1 | 11/2004 | Owusu |
| 2005/0154098 A1 | 7/2005 | Phillips |
| 2008/0095987 A1 | 4/2008 | Wei |
| 2008/0212181 A1 | 9/2008 | Wu |
| 2011/0211257 A1 | 9/2011 | Hannington et al. |
| 2014/0268337 A1 | 9/2014 | Lu et al. |

FOREIGN PATENT DOCUMENTS

| | | |
|---|---|---|
| CN | 1791812 | 6/2006 |
| CN | 101553527 | 10/2009 |
| JP | 2003-084113 | 3/2003 |
| JP | 2003-84113 | 3/2003 |
| JP | 2004-338222 | 12/2004 |
| JP | 2005-325320 | 11/2005 |
| JP | 2010-158811 | 7/2010 |
| JP | 2011-32328 | 2/2011 |
| JP | 2016-044300 | 4/2016 |
| JP | 2016-44300 | 4/2016 |
| KR | 10-2000-0027859 | 5/2000 |
| KR | 10-2001-0067750 | 7/2001 |
| TW | 554016 | 9/2003 |
| WO | 97/37251 | 10/1997 |

OTHER PUBLICATIONS

International Preliminary Report on Patentability dated Feb. 8, 2022 issued in corresponding IA No. PCT/US2020/042216 filed Jul. 16, 2020.

* cited by examiner

RETROREFLECTIVE FILMS COMPRISING FLUORESCENT DYES

CROSS-REFERENCE TO RELATED APPLICATION

The present application is a 371 of International Application No. PCT/US2020/042216, which was published in English on Feb. 11, 2021, and claims the benefit of U.S. Provisional Patent Application No. 62/882,647 filed Aug. 5, 2019, both of which are incorporated herein by reference in their entireties.

FIELD

The present disclosure relates generally to retroreflective films and methods for producing the same. In particular, the present disclosure relates to retroreflective films comprising one or more layers (or coating layers) including a specific amount of fluorescent dye to adjust the color value (e.g., chromaticity coordinates) within a desired color space and improve luminance factor, while maintaining minimum retroreflectivity standards.

BACKGROUND

Retroreflective films are used to enhance the nighttime visibility of street and highway signage (e.g., road signs), as well as trucks, buses and semi-tractor trailers that often travel along interstate highways. For example, strips of retroreflective film can be adhered around the edges of the trailer so that other motorists in the vicinity of the vehicle will readily perceive not only the presence but the extent of the vehicle. The use of such retroreflective films on trucks and other vehicles has contributed to the safety of the highways by preventing nighttime collisions.

Retroreflective films can be coated with a thin layer of metallic films to form metallized retroreflective films. For example, in some retroreflective film constructions, a metallic layer can be coated on a prismatic layer to form a metallized prismatic retroreflective film. Metallized retroreflective films generally maintain good performance over a larger range of entrance angles under nighttime conditions than non-metallized retroreflective films. Non-metallized retroreflective films rely entirely on total internal reflection for reflection. Consequently, light which impinges on the prism faces at an angle less than the critical angle, will only be minimally reflected. By contrast, when a retroreflective film is metallized by the application of a thin coating of a specular material such as aluminum or silver, a substantial percentage of incident light will always be retroreflected regardless of the angle of incidence. In short, the higher retroreflectance of metallized versus non-metallized retroreflective sheeting over a broader range of incidence angles in combination with the non-necessity of hermetic seals renders it more consistently brighter under nighttime conditions.

Unfortunately, presently-known forms of metallized retroreflective films perform poorly under daytime conditions. This is a major shortcoming, as most transportation regulations in the worldwide require such sheeting to have a minimal daytime luminance factor. In contrast to non-metallized retroreflective films, metallized retroreflective material can appear relatively dark under daytime conditions. This deficiency in daytime luminance has resulted in the use of non-metallized retroreflective material which are inherently more limited in their nighttime performance.

There is a need for metallized retroreflective films that maintain all of the nighttime performance advantages of such sheeting, but which also comply with the standards mandated by transportation regulations for luminance and retroreflectivity.

SUMMARY

In one embodiment, the present disclosure relates to a retroreflective film comprising: a prismatic layer having a plurality of retroreflective prism elements; a reflective layer comprising a metal coating conforming to the prismatic layer so that the film retroreflects light; and one or more layers above the reflective layer; wherein the prismatic layer or the one or more layers above the reflective layer comprises a fluorescent dye from 0.0001 wt. % to 0.05 wt. %, based on the total weight of the layer. In some embodiments, the prismatic layer or the one or more layers above the reflective layer comprises the fluorescent dye from about 0.001 wt. % to 0.01 wt. %, based on the total weight of the layer. In some embodiments, the prismatic layer and the one or more layers above the reflective layer are in an optical path of the film. In some embodiments, the film further comprises one or more layers below the reflective layer. In some embodiments, the one or more layers below the reflective layer is not in the optical path. In some embodiments, the retroreflective film comprises an optional protective layer, the prismatic layer, the reflective layer, an adhesive layer, and a liner. In some embodiments, the retroreflective film is sequentially arranged from top to bottom comprising the optional protective layer, the prismatic layer, the reflective layer, the adhesive layer, and the liner. In some embodiments, the protective layer is transparent. In some embodiments, the protective layer comprises the fluorescent dye. In some embodiments, the protective layer comprises a UV absorbing layer. In some embodiments, the reflective layer comprises one or more aluminum, chrome, or silver. In some embodiments, the reflective layer is opaque. In some embodiments, the film has a luminance factor of at least 15 as defined by the CIE 1931 Standard Colorimetric System. In some embodiments, the retroreflective film has an average retroreflectivity of at least 350 cd·lx$^{-1}$·m$^{-2}$ when tested according to ASTM E 810-03 (2013). In some embodiments, the retroreflective film has chromaticity coordinates (x,y) within the area defined by the following coordinates: (0.305, 0.315), (0.335, 0.345), (0.325, 0.355) and (0.295, 0.325). In some embodiments, the one or more layers above the reflective layer is a coating layer comprising the fluorescent dye. In some embodiments, the coating layer is sandwiched between the prismatic layer and the reflective layer.

In one embodiment, the present disclosure relates to a retroreflective film comprising: a prismatic layer having a plurality of retroreflective prism elements; a reflective layer conforming to the prismatic layer so that the film retroreflects light; one or more layers above the reflective layer; wherein the one or more layers above the reflective layer comprises a coating composition comprising: an organic solvent from 40 wt. % to 60 wt. %, based on the total weight of the composition; an aromatic hydrocarbon from 10 wt. % to 40 wt. %, based on the total weight of the composition; an impact-modified acrylic from 10 wt. % to 40 wt. %, based on the total weight of the composition; and a fluorescent dye package comprising a fluorescent dye, wherein the fluorescent dye is present from 0.0001 wt. % to 0.05 wt. %, based on the total weight of the composition. In some embodiments, the fluorescent dye package comprises: an impact-modified acrylic and a UV additive from 90 wt. % to 99.8 wt. %, based on the total weight of the dye package; and the fluorescent dye from 0.50 wt. % to 3 wt. %, based on the total weight of the dye package. In some embodiments, the fluorescent dye is fluorescent yellow-green dye, wherein the fluorescent yellow-green dye is provided in an amount from 1.0 wt. % to 1.5 wt. %, based on the total weight of the dye package. In some embodiments, the fluorescent dye comprises: an impact-modified acrylic from 80 wt. % to 98 wt. %, based on the total weight of the dye package; an impact-modified acrylic and a UV additive from 1 wt. % to 10 wt. %, based on the total weight of the dye package; and the fluorescent dye from 0.01 wt. % to 1 wt. %, based on the total weight of the dye package. In some embodiments, the fluorescent dye is fluorescent orange dye, wherein the fluorescent orange dye is provided in an amount from 0.10 wt. % to 0.20 wt. %, based on the total weight of the dye package. In some embodiments, the coating composition is applied to the prismatic layer of the retroreflective film. In some embodiments, a luminance factor of the retroreflective films is at least 15 as defined by the CIE 1931 Standard Colorimetric System. In some embodiments, an average retroreflectivity of the retroreflective film is at least 350 cd·lx$^{-1}$·m$^{-2}$ when tested according to ASTM E 810-03 (2013). In some embodiments, the chromaticity coordinates (x,y) of the retroreflective film is within the area defined by the following coordinates: (0.305, 0.315), (0.335, 0.345), (0.325, 0.355) and (0.295, 0.325). In some embodiments, the coating composition forms a layer having a thickness from 10 microns to 80 microns.

BRIEF DESCRIPTION OF DRAWINGS

The present disclosure is described in detail below with reference to the appended drawings, wherein like numerals designate similar parts.

DETAILED DESCRIPTION OF THE INVENTION

Figure 1A:
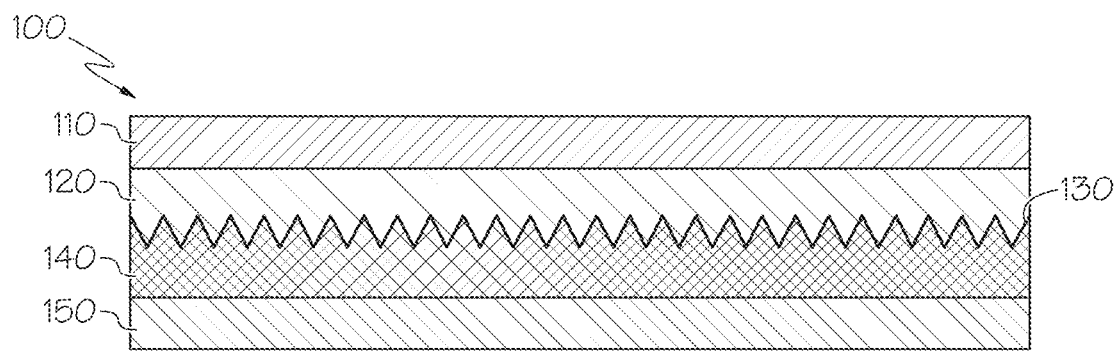
FIG. 1A shows a cross-sectional view of a retroreflective film in accordance with embodiments of the present disclosure.

The present disclosure generally relates to retroreflective films that, when employed with specific quantities of fluorescent dye in specific layers, provide advantageous combinations of performance characteristics. Specifically, the present disclosure is related to retroreflective films including a small amount of fluorescent dye (e.g., less than 0.05 wt. %) in one or more layers (or a coating layer) such that the color of the film is within a preferential portion of a desired color space. It was surprisingly found that retroreflective films having one or more layers (e.g., a metallized prismatic layer) with a small amount of fluorescent dye adjusted color readings (e.g., chromaticity coordinates) of the film to specific regions located within a color space to comply with industry standards (e.g., United States, Europe, China and Brazil) while improving luminance factor and complying with retroreflectivity standards.

In some embodiments, articles including the retroreflective films described herein have a color reading that is situated in the color space defined by various standards organizations. For example, an article including the retroreflective films can have a color reading within CIE chromaticity coordinates (0.305, 0.315), (0.335, 0.345), (0.325, 0.355) and (0.295, 0.325), which encompasses most of the worldwide color specifications and is known as the Least Common Denominator (LCD) color space. In particular, the retroreflective films described herein have one or more layers (or coating layers) having a very small amount of fluorescent dye (e.g., less than 0.05 wt. %) that shifts the color coordinates of the film into an ideal region of the LCD color space (e.g., a center region). The retroreflective film described herein can also achieve a good balance of high luminance and without sacrificing retroreflectivity. Specifically, the retroreflective films can achieve a luminance factor (brightness, or cap Y) of at least 15 and a minimum retroreflectivity that satisfies requirements of a particular country specification (e.g., at least 350 cd·lx$^{-1}$·m$^{-2}$.

With conventional retroreflective films, there is a delicate balance between controlling the color readings to fall within particular regions of a color space and achieving acceptable luminance and retroreflectivity. For example, many industry standards (e.g., China, Brazil, Malaysia, Mexico, France, Thailand, etc.) require minimum retroreflectivity requirements at all incident angles in a particular specification, but must also have color readings within a particular color space, e.g., color coordinates, and comply with the minimum luminance factor requirement. Typically, a white pattern is printed on a metallized retroreflective film to improve luminance; however, this reduces retroreflectivity. Alternatively, a pattern can be etched into the tooling to make a retroreflective film to improve luminance; however, this also reduces retroreflectivity. In some cases, if the specification calls for a minimum luminance of 15, the embossing tool and process used yields an average luminance factor of 14.0 with a standard deviation of 0.8. A majority of the samples will not meet the standard requirements and an opaque white pattern may need to be printed on the film to increase the luminance factor. This will reduce the retroreflectivity proportionately to the surface area covered by the pattern. Additionally, color readings of these retroreflective films can be outside a particular region. Therefore, existing retroreflective films can have color readings that are outside the required chromaticity coordinates and/or have poor luminance or retroreflectivity.

The inventors have now discovered that retroreflective films having one or more layers (or coating layers) with small amounts of fluorescent dye (e.g., less than 0.05 wt. %) increases luminance without utilizing a printed pattern and shifts a color value (e.g., chromaticity coordinates) of the retroreflective film into a central area of a desired color space, while meeting or exceeding the minimum standard requirement for retroreflectivity. Specifically, introducing specific amounts of fluorescent dye in, for example, a metallized prismatic layer of a retroreflective film increases the luminance factor of the retroreflective film and shifts the chromaticity coordinates substantially into a specific region of a LCD color space (i.e., plot of a color box defined by "x", "y" color coordinates). Retroreflective films exhibiting chromaticity coordinates within this defined LCD color space can be considered to be generally acceptable with most industry standards with minimal negative effects on retroreflectivity and appearance of the article.

Additionally, it has been found that a retroreflective film comprising a specific amount of fluorescent dye from 0.0001 wt. % to 0.05 wt. % in one or more layers (or coating layers) can also achieve the surprising results mentioned above without changing/altering the appearance (e.g., color) of the film. Specifically, an article applied with the retroreflective film described herein may have chromaticity coordinates within a defined color box with minimal effect on appearance of the article. Additionally, the fluorescent dye improves the daytime luminance for articles, while still maintaining a substantially white appearance (e.g., the very small amount of fluorescent dye/color is not visible, or minimally visible, to the naked eye). For example, when yellow-green fluorescent dye is added to the formulation for producing a white retroreflective film, the white retroreflective film maintains a substantially white appearance.

In some embodiments, the fluorescent dye can be provided in a formulation that is coated on one or more layers of the retroreflective film to form a coating layer. In some embodiments, the fluorescent dye can be provided in a formulation for producing one or more layers in the retroreflective film. For example, the fluorescent dye can be blended in a polymeric matrix and co-extruded to form the prismatic layer of the retroreflective film.

In some embodiments, one or more layers of a retroreflective film includes a fluorescent dye ranging from 0.0001 wt. % to 0.05 wt. %, based on the total weight of the formulation, e.g., from 0.0002 wt. % to 0.03 wt. %, from 0.0004 wt. % to 0.01 wt. % from 0.0006 wt. % to 0.008 wt. %, from 0.0008 wt. % to 0.006 wt. %, from 0.001 wt. % to 0.005 wt. %, or from 0.002 wt. % to 0.004 wt. %. In term of upper limits, one or more layers of a retroreflective film includes less than 0.05 wt. % fluorescent dye based on the total weight of the formulation, e.g., less than 0.04 wt. %, less than 0.02 wt. %, less than 0.01 wt. %, less than 0.008 wt. %, less than 0.006 wt. %, or less than 0.005 wt. %. In term of lower limits, one or more layers of a retroreflective film includes greater than 0.0001 wt. % fluorescent dye based on the total weight of the formulation, e.g., greater than 0.0002 wt. %, greater than 0.0004 wt. %, greater than 0.0005 wt. %, greater than 0.0006 wt. %, greater than 0.0008 wt. %, or greater than 0.001 wt. %. Similar amounts of fluorescent dye can be provided in coating formulation for producing one or more coating layers on the retroreflective film.

Definitions

"CIE" refers to the Commission International de l'Eclairage (International Commission on Lighting) which is the responsible body for international recommendations for photometry and colorimetry.

"CIE chromaticity diagram" or "x, y diagram" refers to a two-dimensional diagram in which points specified by chromaticity coordinates (x, y) represent the chromaticities of color stimuli in the CIE color matching system, as is known in the art. The "color" (or "chromaticity" or "chromaticity coordinates") of a film or article can thus be precisely measured or specified by a point or region (expressed in terms of one or more chromaticity coordinates (x,y) on the CIE chromaticity diagram, using the CIE 1931 standard colorimetric system. This system uses a CIE Standard Illuminant D65 and a 0°/45° geometry (illumination along a direction coincident with the surface normal axis (0°) and detection along a direction 45° from the surface normal axis), thus simulating normal daytime illumination and observation conditions. Unless otherwise noted, this convention for specifying color is adhered to herein.

"Luminance factor" is a measure of the perceived brightness of a film or article under normal daytime illumination and observation conditions. This factor is expressed herein as the well-known CIE tristimulus value "Y" for the film or article. The luminance factor Y is the second of three CIE tristimulus values (X,Y,Z) representing the amounts of three primary colors that specify a color stimulus. Tristimulus values can be calculated from the spectral power density of light emanating from a sample using the above-mentioned CIE Standard Illuminant D65 and 0°/45° measurement geometry.

"Retroreflective" refers to a surface of a film or article that returns a substantial portion of incident light back in the direction of the source of illumination over a wide range of incidence angles. The degree to which a surface is retroreflective is then referred to as its coefficient of retroreflection ("$R_A$") or simply as its retroreflectivity. Retroreflectivity is expressed in units of candelas per lux per square meter ($cd \cdot lx^{-1} \cdot m^{-2}$) and unless otherwise noted is measured with a −4° entrance angle and a 0.2° observation angle.

"LCD color box" refers to a color within the area defined by the following chromaticity coordinates:

TABLE 1

| x | y |
|---|---|
| 0.305 | 0.315 |
| 0.335 | 0.345 |
| 0.325 | 0.355 |
| 0.295 | 0.325 |

Retroreflective Film

In some embodiments, one or more layers of a retroreflective film may comprise specific amounts of fluorescent dye dispersed in a polymer matrix. The one or more layers of the retroreflective film can be made by extruding a mixture including a very small amount of the fluorescent dye (or mixtures of fluorescent dyes) and polymer to form one or more layers of the retroreflective film. Suitable fluorescent dye, levels, and combinations are disclosed that can yield a retroreflective film exhibiting both a specified minimum value for retroreflectivity (e.g., at least 200 or 350 $cd \cdot lx^{-1} \cdot m^{-2}$ and a specified level of daytime brightness (e.g., a luminance factor of at least 15). For example, the retroreflective films described herein can satisfy the standards set by Brazil, China, Thailand, and the United States. The amount of fluorescent dye associated with such enhanced performance tend to correspond to a particular preferential color space that is a subset of the overall LCD color spaces. In particular, the preferential region within the LCD color space is defined by CIE chromaticity coordinates (0.305, 0.315), (0.335, 0.345), (0.325, 0.355) and (0.295, 0.325) which encompasses most of the worldwide color specifications.

It was found that adding a specific concentration of fluorescent dye to a formulation for producing one or more layers of a retroreflective film during extrusion both advantageously improved color (e.g., as defined by the color box) and luminance while maintaining reflectivity and appearance, especially for white retroreflective articles. In particular, a specific quantity of the fluorescent dye in the one or more coating layers of the retroreflective film raises the daytime luminance (CapY), and moves the x values and y values into the chromaticity coordinates of the LCD color box for while maintaining a white appearance.

The retroreflective film can have various constructions. In some embodiments, the retroreflective film comprises a protective layer, a reflective layer, a prismatic layer, an adhesive layer, and a release liner. The layers can ordered in any arrangement. For example, from top to bottom, the retroreflective film may comprise a protective layer, a prismatic layer, a reflective layer, an adhesive layer, and a release liner. In this embodiment, the protective layer is the frontmost layer (i.e., closest to the observer) and is positioned in front of the prismatic layer. Thus, the protective layer should be transparent and/or translucent to allow light to reach the prismatic layer, and is preferably highly transparent.

In some embodiments, any one of the layers of the retroreflective film that is in the optical path includes the specific amounts of fluorescent dye. For example, the optional protective layer, the prismatic layer, or a coating layer in the optical path may include the specific amounts of fluorescent dye. In some embodiments, the outermost layer (e.g., the protective layer) may include the fluorescent dye. In some embodiments, the outermost layer is the prismatic layer. In some embodiments, the prismatic layer (e.g., metallized prismatic layer) may include the fluorescent dye. In some embodiments, a thin layer embossed on the surface of the prismatic layer may include the fluorescent dye.

In some embodiments, one or more layers of the retroreflective film includes a fluorescent dye ranging from 0.0001 wt. % to 0.05 wt. %, based on the total weight of the formulation, e.g., from 0.0002 wt. % to 0.05 wt. %, from 0.0004 wt. % to 0.04 wt. %, from 0.0005 wt. % to 0.04 wt. %, from 0.0006 wt. % to 0.03 wt. %, from 0.0008 wt. % to 0.02 wt. %, from 0.001 wt. % to 0.01 wt. %, or from 0.002 wt. % to 0.005 wt. %. In term of upper limits, one or more layers of the retroreflective film includes less than 0.05 wt. % fluorescent dye, based on the total weight of the formulation, e.g., less than 0.04 wt. %, less than 0.03 wt. %, less than 0.02 wt. %, less than 0.01 wt. %, less than 0.009 wt. %, or less than 0.008 wt. %. In term of lower limits, one or more layers of the retroreflective film includes greater than 0.0001 wt. % fluorescent dye, based on the total weight of the formulation, e.g., greater than 0.0002 wt. %, greater than 0.0004 wt. %, greater than 0.0005 wt. %, greater than 0.0006 wt. %, greater than 0.0008 wt. %, or greater than 0.001 wt. %. In some embodiments, a coating composition can be applied to one or more layers of the retroreflective film comprising the aforementioned amounts of fluorescent dye.

Figure 1B:
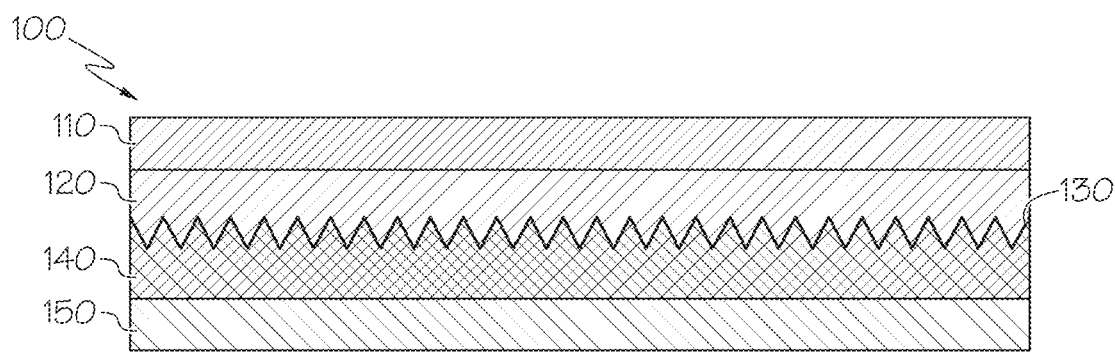
FIG. 1B shows a cross-sectional view of a retroreflective film in accordance with embodiments of the present disclosure.
Figure 1C:
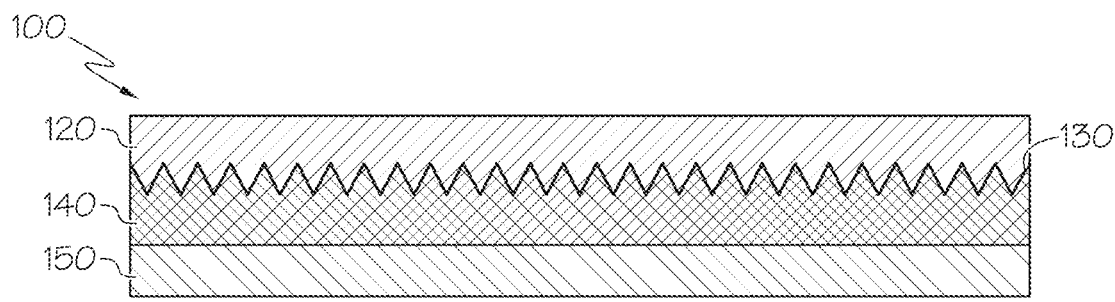
FIG. 1C shows a cross-sectional view of a retroreflective film in accordance with embodiments of the present disclosure.
Figure 1D:
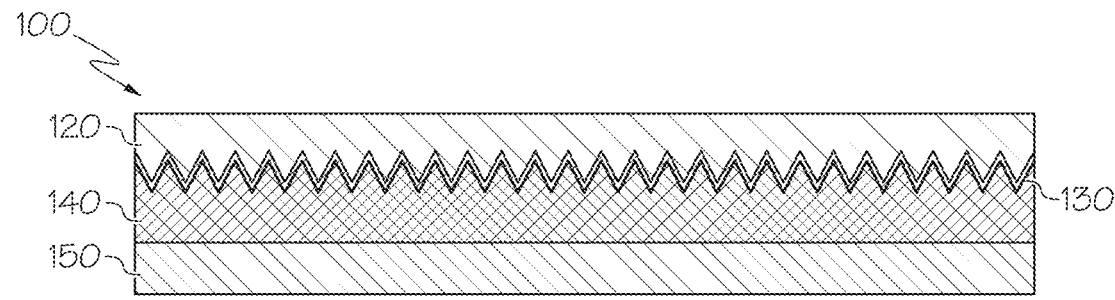
FIG. 1D shows a cross-sectional view of a retroreflective film in accordance with embodiments of the present disclosure.

FIGS. 1A-1D show various embodiments of a retroreflective film 100 having one or more layers including a fluorescent dye (FIGS. 1A-1C) and a coating layer comprising a fluorescent dye (FIG. 1D). Each of the embodiments of FIGS. 1A-1D illustrate a retroreflective film 100 comprising an optional protective layer 110, a prismatic layer 120, a reflective layer 130 (or metallization layer), an adhesive layer 140, and a release liner 150. In some embodiments, the retroreflective film 100 may include one or more layers above the prismatic layer 120. For example, the retroreflective film 100 may include a printed layer, a UV-resistant layer, a coating layer, or combinations thereof, above the prismatic layer 120. In some embodiments, the prismatic layer 120 may be the outermost layer (e.g., no layers above the prismatic layer) as shown in FIGS. 1C and 1D.

FIGS. 1A and 1B illustrate constructions of the retroreflective film 100 comprising a protective layer 110, a prismatic layer 120, a reflective layer 130, an adhesive layer 140, and a release liner 150. In some embodiments, the protective layer 110 and the prismatic layer 120 are in the optical path. In some embodiments five or more layers may be in the optical path. As mentioned above, any layer of the retroreflective film 100 can include the fluorescent dye. For example, FIG. 1A shows an embodiment in which the protective layer 110 includes fluorescent dye and FIG. 16 shows an embodiment in which the prismatic layer 120 includes fluorescent dye.

FIG. 1C illustrates a retroreflective film 100 that does not include a protective layer 110. In this embodiment, the prismatic layer 120 is the outermost layer and includes the fluorescent dye. Similarly, the retroreflective film 100 shown in FIG. 1D does not include a protective layer 110. In this embodiment, a coating composition comprising fluorescent dye is applied as a thin layer on the surface of the prismatic layer 120 (e.g., between the prismatic layer 120 and the reflective layer 130). FIG. 1D shows an embodiment in which the fluorescent dye is not included in any layer of the retroreflective film 100. Instead, a coating composition comprising fluorescent dye is applied to a layer of the retroreflective film 100 in the optical path. For example, the coating layer can be applied as a thin layer on the embossed surface of the prismatic layer 120.

The protective layer 110 is constructed to protect the integrity of the other layers (and particularly the prismatic layer) against weather, abrasion, peeling, high temperature, and/or rain acidity. In some embodiments, a coating is applied to the protective layer. The protective layer 110 can made from a thermoplastic resin and/or a thermoplastic polymer, such as vinyl or polyurethane. In some embodiments, the protective layer 110 can be a UV absorbing layer. In some embodiments, the UV absorbing layer may comprise a polymer resin including a UV additive. In some embodiments, the UV absorbing layer may comprise an acrylic resin with a UV additive. Embodiments of UV absorbing layers are further described in U.S. Pat. Nos. 6,514,594, 6,972,147, and 5,387,458, which are incorporated herein in their entireties.

In some embodiments, the protective layer 110 is transparent and colorless, however, the layer may be transparently colored, if desired. In some embodiments, the protective layer 110 is comprised of a plastics material such as an acrylic but may be comprised of other suitable materials, for example a polycarbonate, polyolefins (linear or branched), polyamides, polystyrenes, nylon, polyesters, polyester copolymers, polyurethanes, polysulfones, polyvinylchloride, styrene-maleic anhydride copolymers, styrene-acrylonitrile copolymers, ionomers based on sodium or zinc salts of ethylene methacrylic acid, polymethyl methacrylates, cellulosics, fluoroplastics, acrylic polymers and copolymers, polyacrylonitriles, and ethylene-vinyl acetate copolymers. Included in this group are acrylates such as ethylene methacrylic acid, ethylene methyl acrylate, ethylene acrylic acid and ethylene ethyl acrylate.

In embodiments, including an optional protective layer 110, a prismatic layer 120 may be located below the protective layer 110. The prismatic layer 120 has a plurality of retroreflective elements embossed, casted, molded, or otherwise formed thereon. The retroreflective elements can comprise an array of cube corner elements (i.e., prism structures) which each have three mutually perpendicular faces meeting at a single corner or apex. In some embodiments, the total cube area of each retroreflective element can be about 1 mm$^2$ or less, which can be considered as microprismatic elements and/or microcubes. The present retroreflective film 100 contemplates the use of microcubes and/or larger cube corner elements. Examples of typical retroreflective films or sheets are disclosed in U.S. Pat. Nos. 5,122,902; 6,155,689; and 7,445,347; and in Publication No. US2008/0212181. Publications, patents and patent applications are referred to throughout this disclosure. All references cited herein are hereby incorporated by reference.

Typically, the prismatic layer 120 is formed from a sheet material having first and second flat surfaces. The retroreflective elements are formed by embossing, casting, or molding in the first surface of the sheet material and the elements extend into the sheet material a certain depth. Thus, the prismatic layer 120 is made of a material which is compatible with the element-forming method (e.g., embossing, casting, molding) and which is transparent/translucent (and preferably highly transparent). Suitable materials include, for example, acrylic or polycarbonate. The bottom surface of the protective layer 110 and/or the top surface of the prismatic layer 120 can optionally be preprinted with a non-transparent (i.e., translucent or opaque) pattern.

The prismatic layer 120 can be comprised of the same plastics material as the protective layer, namely, the prismatic layer can be comprised of acrylic assuming the protective layer is also comprised of an acrylic, or it can be comprised of a different plastic material. For example, if the protective layer is comprised of PVC, then the prismatic layer can be comprised of polycarbonate or acrylic.

The retroreflective film 100 also includes a reflective layer 130 (e.g., a metallized layer) or metal coating comprised of a metal such as aluminum, but other suitable metals, for example, silver or chrome can be used. In some embodiments, the reflective layer 130 is applied as a metallized coating to the prismatic elements of the prismatic layer by vapor deposition, but the reflective layer 130 can be applied by other methods such as sputtering, plasma coating, vacuum metallizing, and the like. The reflective layer 130 adheres very well to the prismatic elements and conforms to the surface provided by the prismatic elements. In some embodiments, the prismatic layer 120 underlies the protective layer 110 and the reflective layer 130 underlies the prismatic elements.

In some embodiments, the reflective layer 130 can comprise a layer of reflective metal (e.g., silver, aluminum, gold, copper) vapor-deposited or otherwise applied over the exposed surfaces of the cube corner elements. The layer can alternatively comprise a binder layer in which flakes of reflective metal are embedded.

The thickness of the reflective layer 130 can be significantly smaller than the prismatic layer 120. For example, reflective layer 130 can have a thickness in the range of 0.02 μm (about 0.0008 mils) to 0.125 μm (about 0.005 mils). The reflective layer 130 can be essentially opaque (i.e., neither transparent nor translucent) and/or it can have a visible light transmission of less than 3.0%, less than 2.5%, less than 2.0%, and/or less than 1.0%.

The adhesive layer 140 can comprise an acrylic-based adhesive or an emulsion-based adhesive. The adhesive can be heat-activated, solvent-activated, or pressure-sensitive (which is often preferred). The adhesive can be permanent (i.e., attached medium cannot be removed without noticeable damage) and/or removeable (but will usually be permanent in a license plate situation). In any event, the adhesive layer 140 serves the functional purpose of adhering the film to the substrate. However, other substrate-adhering techniques are possible with, and contemplated by, the present invention. For example, the substrate could include an adhesive layer 140 on its front surface for film-adhering purposes, or an adhesive could be applied at the location whereat the substrate-film adhering step is performed. Moreover, non-adhesive techniques, such as heat bonding or mechanical attaching, could be used to adhere the film to the substrate. In these instances, the film would not have to include the adhesive layer 140 (although another space-filling medium may sometimes be necessary).

The release liner 150 can comprise a carrier web (e.g., paper or polyester) coated with a release agent (e.g., polyethylene or silicone). The function of the release liner 150 is to cover the adhesive layer 140 until the substrate-film adhering step is performed during the assembly of the article and/or to act as a carrier layer during formation of the adhesive layer 140. In either event, if the film 100 does not include an adhesive layer 140, it may not include the release liner 150. Additionally, if the adhesive layer 140 is such that pre-assembly protection and/or a carrying medium is not necessary, the release liner 150 could be omitted from the film's construction. In any event, if film 100 does include the release liner 150, it will typically be removed prior to the film's incorporation into the retroreflective article.

The retroreflective article and/or the retroreflective film according to the present invention can achieve high retroreflectivity (measured in, for example, in units of candelas (cd) per lux (lx) per square meter (m$^2$) (cd·lx$^{-1}$·m$^{-2}$)). Specifically, for example, at an observation angle of 0.2°, and entrance angle at −4°, retroreflectivity in the range of 900 cd·lx$^{-1}$·m$^{-2}$ and 1300 cd·lx$^{-1}$·m$^{-2}$, can be obtained. The entrance angle θ is the angle between the entering light direction and a line perpendicular (horizontal in the illustrated embodiment) to the reflecting plane of the article. The observation angle α is the angle between the entering light direction and the leaving light direction.

Coating Layer on Retroreflective Film

In some embodiments, a coating composition can be coated (or a coating layer can be printed) on one or more layers of a retroreflective film to achieve the aforementioned performance characteristics. For example, a coating composition having a specific amount of fluorescent dye can be applied on a layer of the retroreflective film that is in the optical path. The coating composition includes a small amount of fluorescent dye that increases the luminance factor and shifts the color coordinates into an ideal range (e.g., the color box) with minimal effect on retroreflectivity and appearance of a retroreflective film.

In some embodiments, the coating composition includes fluorescent dye in a range from 0.0001 wt % to 0.05 wt %, based on the total weight of the coating composition. Much like the formulation for the one or more layers of the retroreflective film, the same quantities of fluorescent dye (e.g., less than 0.01 wt. %) were found to achieve the aforementioned performance characteristics. In some embodiments, the coating composition includes a fluorescent yellow green dye or a fluorescent orange dye. It was surprisingly found that the coating composition including a fluorescent dye in the specified ranges increased the luminance factor in a range from 1.5 to 5 and shifted the color value into an ideal region of the LCD Box. The coating composition comprising a fluorescent dye can be coated directly on one or more layers of the retroreflective film. In some embodiments, the coating composition be applied to any layer of the retroreflective film, e.g., as a top layer, bottom layer, or sandwiched between layers.

In some embodiments, the thickness of the coating layer may range from 10 micron to 80 micron, e.g., from 12.5 micron to 76 micron, from 15 micron to 63 micron, from 18 micron to 57 micron, from 20 micron to 50 micron, from 25 micron to 46 micron, or from 30 micron to 43 micron. In terms of upper limits, the coating thickness of the coating composition is less than 76 micron, e.g., less than 71 micron, less than 66 micron, less than 61 micron, less than 56 micron, or less than 50 micron. In terms of lower limits, the coat weight of the coating composition is greater than 12.5 micron, e.g., greater than 15 micron, greater than 18 micron, greater than 20 micron, greater than 23 micron, or greater than 25 micron. However, for a given film thickness and fluorescent dye composition, higher fluorescent dye loading percentages tend to decrease the luminance factor of the article, and thus it is preferable to achieve the desired color characteristics with as low of a percent weight of fluorescent dye as possible. The appropriate fluorescent dye loading percentages will also depend on the thickness of the film in which the fluorescent dye is loaded.

The thickness of the coating composition (when dried) on the retroreflective film ranges from 0.5 micron to 20 micron, e.g., 0.8 micron to 18 micron, 1 micron to 16 micron, 2 micron to 14 micron, 3 micron to 12 micron, 4 micron to 10 micron, or 6 micron to 8 micron. In terms of upper limits, the thickness of the coating composition is less than 20 micron, e.g., less than 18 micron, less than 16 micron, less than 14 micron, less than 12 micron, less than 10 micron, or less than 8 micron. In terms of lower limits, the thickness of the coating composition is greater than 0.5 micron, e.g., 0.6 micron, greater than 0.8 micron, greater than 1 micron, greater than 2 micron, greater than 4 micron, or greater than 6 micron. The retroreflective film is able to achieve increased luminance and ideal color coordinates at very low thicknesses compared to conventional pigment formulations, thereby preventing adverse effects on reflectivity and appearance of the metallized white article.

Fluorescent Dye

Any suitable fluorescent dye in the aforementioned amounts can be used in the formulation for producing a retroreflective article. In some embodiments, the fluorescent dyes can be benzoxanthenes, benzothiazines, perylene imides, thioxanthenes, thioindigoids, naphthalimides coumarins, or combinations thereof. In some embodiments, the fluorescent dyes may include fluorescent yellow-green, fluorescent orange, and fluorescent yellow, or combinations thereof. Combining dyes having different coloration properties can be useful to create an article having a color tailored to meet certain industry needs.

Commercially available fluorescent dyes may include benzoxanthene dye which is a yellow-green dye available under the trade name "Lumofast Yellow 3G" from DayGlo Color Corporation. The weight loading of the fluorescent dye will depend upon the thickness of the sheet and the desired color intensity for a particular end use. For example, retroreflective articles generally require that this fluorescent dye should be of sufficient transparency such that the retroreflective function of the article is not significantly impaired.

Another class of fluorescent dyes that can be used in the formulations to produce the present articles are benzothiazine dyes. Commercially available benzothiazine dyes include Huron Yellow D-417 available from DayGlo Color Corporation. The combination of this dye in the formulation results in chromaticity values which fall well within industry standards for retroreflective articles. Other fluorescent dyes include fluorescent orange and/or fluorescent red. For example, a thioxanthene dye of use in this regard is Marigold Orange D-315, available from DayGlo Color Corporation. Other suitable fluorescent dyes include Lumogen F Orange 240 and Lumogen F Red 300, each being perylene imides available from BASF, and Lumogen F Yellow 170 available from BASF. Other dyes include perylene esters and thioindigoid dyes.

Any suitable polymers can be used in the formulation for producing retroreflective articles. Examples of polymers include polycarbonates, polyesters, polystyrenes, styrene-acrylonitrile copolymers, polyurethanes, polyvinyl chloride, polymers formed from acrylic resins, polyarylates, copolyestercarbonates, copolymers, and combinations thereof.

In some embodiments, the fluorescent dye is supplied to the coating composition as a dye package (e.g., including the fluorescent dye and other solvents). For example, the dye package may comprise an acrylic resin and a UV additive. In some embodiments, the acrylic resin is an impact-modified acrylic. In some embodiments, the dye package comprises a fluorescent yellow-green dye, an impact-modified acrylic and a UV additive. In this example, the dye package may comprise impact-modified acrylic and a UV additive from 90 wt. % to 99.8 wt. % and fluorescent yellow-green dye from 0.50 wt. % to 3 wt. %, based on the total weight of the fluorescent dye package. In another embodiment, the dye package comprises an impact-modified acrylic from 80 wt. % to 98 wt. %, an impact-modified acrylic and a UV additive from 1 wt. % to 10 wt. %, a fluorescent orange dye from 0.01 wt. % to 1 wt. %, based on the total weight of the fluorescent dye package.

The process for coating the above dye packages on a retroreflective film can vary. In some embodiments, the dye packages may be mixed with organic solvents, aromatic hydrocarbons, impact-modified acrylic, or combinations thereof to arrive at the coating composition. For example, the dye packages can be mixed with methyl ethyl ketone (e.g., organic solvent), toluene (e.g., aromatic hydrocarbons), and impact-modified acrylic with UV additives. The coating is then applied to a metallized white article, e.g., using a Meyer Rod.

In some embodiments, the coating composition may comprise various thermoplastic polymers including acrylic polymers such as polymethylmethacrylate, vinyl polymers such as PVC and vinyl acrylic copolymers, or polyurethanes such as aliphatic polyether urethanes. In some aspects, the coating composition may include an impact modified polymethylmethacrylate (PMMA) (e.g., Plexiglas™ acrylic DR, MI-7 (Rohm & Haas), Perspex™ acrylic HI-7 (ICI), or blends thereof), a vinyl acrylic formulation (methyl methacrylate/butyl methacrylate) copolymer and a PVC homopolymer) or a polyurethane.

In some embodiments, aliphatic polyurethane coating is produced by casting the urethane onto a polymer coated paper casting sheet or onto a polymer casting sheet. Casting sheet products are well known to the industry and supplied by companies such as Felix Schoeller Technical Papers, Pulaski, N. Y., S. D. Warren of Newton Center, Mass. and Ivex Corporation of Troy, Ohio. The urethane coating is coated onto the casting sheet by standard coating methods such as curtain coating, slot die coating, reverse roll coating, knife over roll coating, air knife coating, gravure coating, reverse gravure coating, offset gravure coating, Meyer rod coating, etc.

The retroreflective film has a front surface and a back surface that is opposite the front surface. The front surface can be substantially smooth. As used herein, the term "substantially smooth" refers to an outer surface that is completely or mostly free of texturing such as voids, protrusions, grooves, or ridges. A surface can have minor indentations or raised portions, or other imperfections not intended during manufacture, and still be considered to be substantially smooth. In some embodiments, the front surface is substantially planar. It is appreciated, however, that the front surface can alternatively have a curved or otherwise nonplanar geometry for at least a portion of its shape. The material of the retroreflective film can vary widely. For example, the material of the retroreflective film can be a transparent plastic material, such as a polymer. The material can be selected from a wide variety of polymers, including, but not limited to, polycarbonates, polyesters, polystyrenes, polyarylates, styrene-acrylonitrile copolymers, urethane, acrylic acid esters, cellulose esters, ethylenically unsaturated nitrites, hard epoxy acrylates, acrylics and the like, with acrylic and polycarbonate polymers being preferred. In some embodiments, the retroreflective film comprises acrylic.

Properties

In some embodiments, a retroreflective film having one or more layers with the aforementioned amounts of fluorescent dye exhibited a luminance factor ranging from 15 to 50 as defined by the CIE 1931 Standard Colorimetric System or ASTM E308 (2017), e.g., from 16 to 48, from 18 to 45, from 20 to 42, from 22 to 40, from 24 to 38, from 26 to 36, from 28 to 34, or from 30 to 32. In terms of upper limits, the retroreflective film exhibited a luminance factor less than 50 as defined by the CIE 1931 Standard Colorimetric System or ASTM E308 (2017), e.g., less than 48, less than 46, less than 44, less than 42, less than 40, or less than 38. In terms of lower limits, the retroreflective film exhibited a luminance factor greater than 15 as defined by the CIE 1931 Standard Colorimetric System or ASTM E308 (2017), e.g., greater than 16, greater than 18, greater than 20, greater than 22, greater than 24, greater than 25, greater than 28, greater than 30, greater than 32, or greater than 35.

In some embodiments, a retroreflective film having one or more layers with the aforementioned amounts of fluorescent dye has a retroreflectivity ranging from 350 cd·lx$^{-1}$·m$^{-2}$ to 1500 ccd·lx$^{-1}$·m$^{-2}$, e.g., from 400 ccd·lx$^{-1}$·m$^{-2}$ to 1400 cd·lx$^{-1}$·m$^{-2}$, from 500 cd·lx$^{-1}$·m$^{-2}$ to 1300 cd·lx$^{-1}$·m$^{-2}$, from 600 cd·lx$^{-1}$·m$^{-2}$ to 1200 cd·lx$^{-1}$·m$^{-2}$, from 700 cd·lx$^{-1}$·m$^{-2}$ to 1100 cd·lx$^{-1}$·m$^{-2}$, from 800 cd·lx$^{-1}$·m$^{-2}$ to 1000 cd·lx$^{-1}$·m$^{-2}$, or from 900 cd·lx$^{-1}$·m$^{-2}$ to 1300 cd·lx$^{-1}$·m$^{-2}$. In terms of upper limits, the retroreflective film has a retroreflectivity less than 1500 cd·lx$^{-1}$·m$^{-2}$, e.g., less than 1450 cd·lx$^{-1}$·m$^{-2}$, less than 1400 cd·lx$^{-1}$·m$^{-2}$, less than 1350 cd·lx$^{-1}$·m$^{-2}$, or less than cd·lx$^{-1}$·m$^{-2}$. In terms of lower limits, the retroreflective film has a retroreflectivity greater than 350 cd·lx$^{-1}$·m$^{-2}$, e.g., greater than 400 cd·lx$^{-1}$·m$^{-2}$, greater than 500 cd·lx$^{-1}$·m$^{-2}$, greater than 600 cd·lx$^{-1}$·m$^{-2}$, or greater than 700 cd·lx$^{-1}$·m$^{-2}$. In some embodiments, at an observation angle of 0.2°, and entrance angle at −4°, the retroreflective film has a retroreflectivity in the range of 900 cd·lx$^{-1}$·m$^{-2}$ and 1300 cd·lx$^{-1}$·m$^{-2}$, can be obtained.

The retroreflective films have one or more layers with fluorescent dye described above produce a compliant retroreflective article that has chromaticity coordinates that are industry compliant. For example, the LCD Color Box is defined by the CIE 1931 standard colorimetric system as falling within a range of chromaticity coordinates (x, y) defined by Table 2. It was found that formulations for retroreflective films including less than 0.01 wt. % of fluorescent dye have color values that are in ideal regions of the LCD Color Box.

Figure 2:
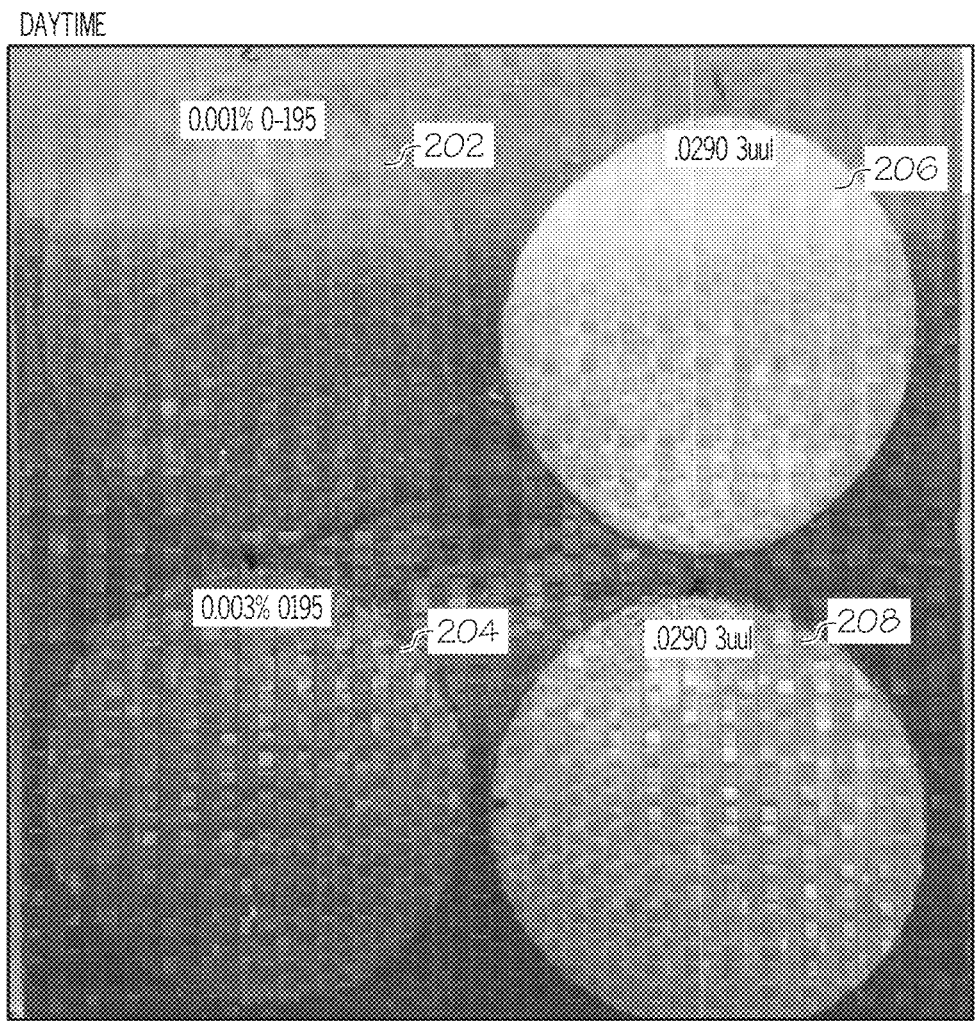
FIG. 2 is a photograph of four press-outs of retroreflective articles in daytime conditions in accordance with embodiments of the present disclosure.
Figure 3:
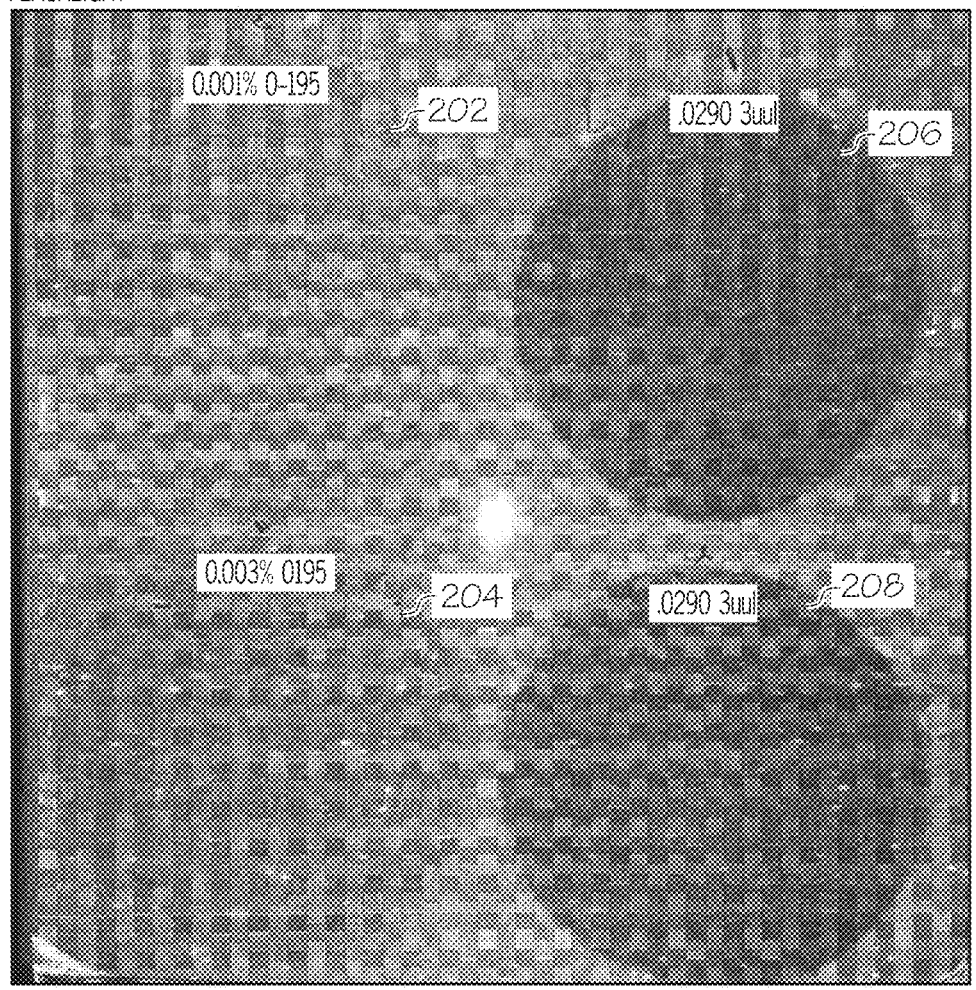
FIG. 3 is a photograph of four press-outs of retroreflective articles in flashlight in accordance with embodiments of the present disclosure.
Figure 4:
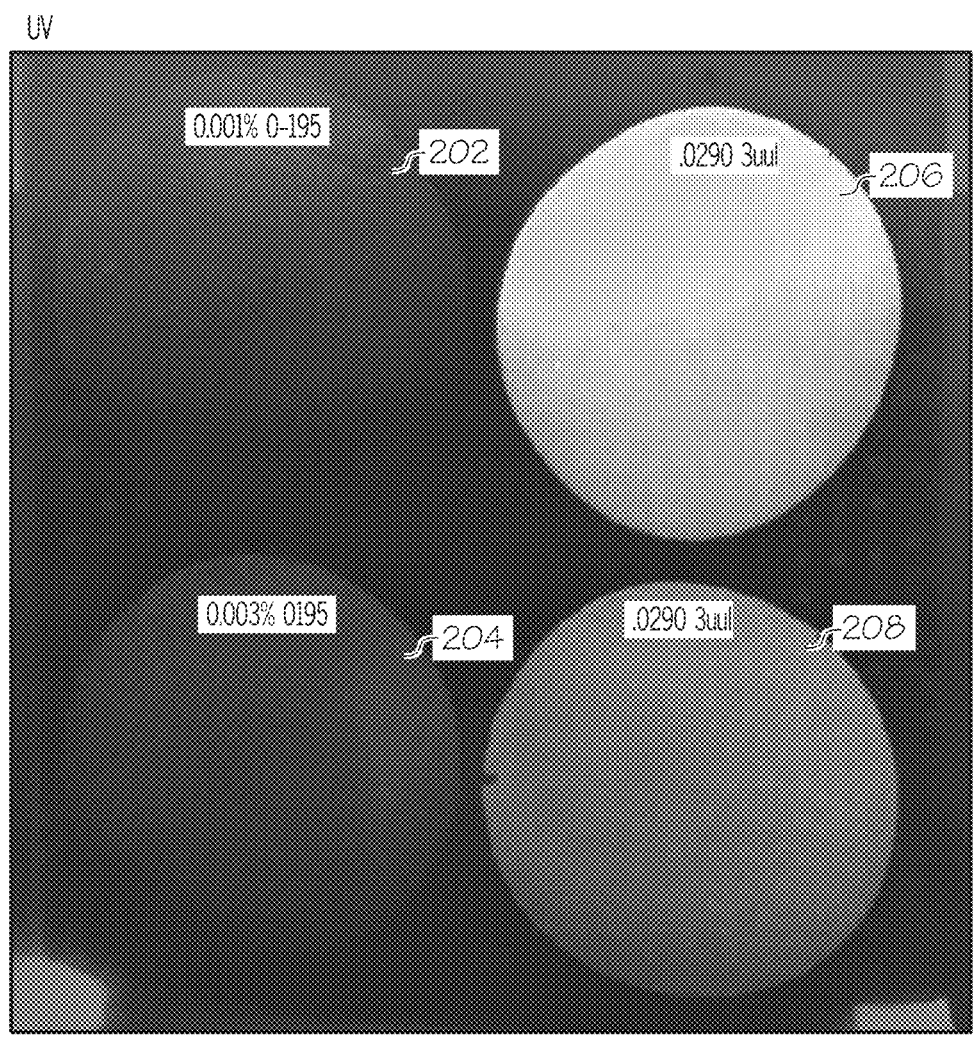
FIG. 4 is a photograph of four press-outs of retroreflective articles in UV light in accordance with embodiments of the present disclosure.

FIGS. 2-4 each show the appearance of articles thermally embossed with four circular prism press-outs containing small amounts of fluorescent dye under different lighting conditions. Specifically, FIG. 2 shows the appearance of articles in daytime conditions, FIG. 3 shows the appearance of articles in response to flashlight, and FIG. 4 shows the appearance of articles in UV light. Each of the Figures show four prism layer press-outs (202, 204, 206, and 208) incorporated into Avery Dennison V6300B metallized white Euro CT base material.

To make small film press outs of polymer blends and colorants, polymer pellets and color, e.g., fluorescent dye, are mixed, placed between heat-resistant sheets (such as Kapton sheets) and then placed between two metal plates in a heated hydraulic press at high pressure until they melt and flatten into the disc shapes seen in FIGS. 2-4. To get a consistent blend of the color, the initial press outs can cooled and folded into a small size and pressed out again. This can be repeated until the color is consistent. The heated hydraulic press used about 6"×6" plates to make 3" to 4" round press outs.

In FIGS. 2-4, each of retroreflective articles 202, 204, 206 & 208 comprise a 150 micron clear acrylic layer and the four press-outs of acrylic resin containing the amount of dye and of the thickness listed below. Retroreflective article 202 includes a prism layer comprising about 0.001 wt. % of yellow-green fluorescent dye and a thickness of about 76 micron. Retroreflective article 204 includes a prism layer comprising 0.003 wt. % of yellow-green fluorescent dye and a thickness of about 76 micron. Retroreflective article 206 includes a prism layer comprising 0.02 wt. % of yellow-green fluorescent dye and a thickness of about 76 micron. Retroreflective article 206 includes a prism layer comprising 0.02 wt. % of yellow-green fluorescent dye and a thickness of about 76 micron. It was found that retroreflective articles 202 and 204 resulted in an increase of luminance of at least 2 and shifted the color coordinates in an ideal region of the color box. Additionally, the film of retroreflective article 204, with a prism layer formulation comprising 0.001 wt. % of yellow-green fluorescent dye and a prism layer thickness of about 76 micron, was barely detectable by the human eye. While retroreflective articles 206 and 208 improved luminance, the color coordinates were well outside the LCD color space.

EXAMPLES

The present invention will be better understood in view of the following non-limiting examples.

Comparative Examples 1-16 were prepared using coating formulations comprising pigment colors. The concentration of the pigment colors were reduced by adding small amounts of impact-modified acrylic resin (e.g., DR-101, impact-modified acrylic resin from PLEXIGLAS®), and then dissolved in a solution comprising 50/50 methyl-ethyl ketone and toluene. Comparatives 1-8 used pigment orange pellets and Comparatives 9-16 used pigment lemon-yellow pellets.

Examples 1-16 were prepared using coating formulations comprising fluorescent dyes. The fluorescent dyes were provided in pellets and the concentration of the fluorescent dyes were reduced by adding small amounts of impact-modified acrylic resin (e.g., DR-101, impact-modified acrylic resin from PLEXIGLAS®). The reduced concentration fluorescent dye was then dissolved in a solution comprising 50/50 methyl-ethyl ketone and toluene. Examples 1-8 used fluorescent orange pellets and Examples 9-16 used fluorescent yellow-green pellets.

Three small circular areas were outlined on separate sheets of white V6300B Euro CT base sheeting manufactured by Avery Dennison. The color and retroreflectivity readings of each outlined circular area were taken to provide the background color and retroreflectivity of the metallized white Euro CT base and the three readings averaged for each sheet. The formulations of Comparatives 1-16 and Examples 1-16 were coated on the metallized white Euro CT base material. The metallized white Euro CT base sheets were coated on the top surface with each of the coating formulations using a Meyer rod. The coating formulations were coated at various thicknesses ranging from about 20 microns to about 60 microns, and the formulations were dried to form the coating layer on each of the metallized white Euro CT base sheets.

Table 2 shows the control for uncoated samples of the metallized white Euro CT base. For each of the control examples, the chromaticity coordinates (x,y), the luminance (Y), and the retroreflectivity at an observation angle of 0.2°, and entrance angle at −4°, was measured before the samples were coated with the coating composition comprising pigment colors.

TABLE 2

| | Luminance | Color Coordinates | | .2-4 |
|---|---|---|---|---|
| | (Y) | x | y | CD |
| Comp. 1 | 17.40 | 0.2979 | 0.3168 | 1143 |
| Comp. 2 | 19.37 | 0.2990 | 0.3183 | 1002 |
| Comp. 3 | 18.01 | 0.2980 | 0.3168 | 1103 |
| Comp. 4 | 19.21 | 0.2985 | 0.3176 | 1115 |
| Comp. 5 | 18.38 | 0.2981 | 0.3168 | 1179 |
| Comp. 6 | 18.12 | 0.2976 | 0.3162 | 1193 |
| Comp. 7 | 19.19 | 0.2984 | 0.3174 | 1122 |
| Comp. 8 | 18.81 | 0.2991 | 0.3177 | 1141 |
| Comp. 9 | 18.19 | 0.2982 | 0.3171 | 1146 |
| Comp. 10 | 18.46 | 0.2981 | 0.3170 | 1089 |
| Comp. 11 | 18.09 | 0.2984 | 0.3172 | 1141 |
| Comp. 12 | 18.66 | 0.2989 | 0.3180 | 1074 |
| Comp. 13 | 18.88 | 0.2983 | 0.3173 | 1138 |

TABLE 2-continued

| | Luminance | Color Coordinates | | .2-4 |
|---|---|---|---|---|
| | (Y) | x | y | CD |
| Comp. 14 | 19.79 | 0.2985 | 0.3175 | 1128 |
| Comp. 15 | 18.00 | 0.2984 | 0.3174 | 1254 |
| Comp. 16 | 17.99 | 0.2977 | 0.3162 | 1071 |

Table 3 shows the control for uncoated samples of the metallized white Euro CT base. For each of the examples, the chromaticity coordinates (x,y), the luminance (Y), and the retroreflectivity at an observation angle of 0.2°, and entrance angle at −4°, was measured before the samples were coated with the coating composition comprising fluorescent dye.

TABLE 3

| | Luminance | Color Coordinates | | .2-4 |
|---|---|---|---|---|
| | (Y) | x | y | CD |
| Example 1 | 19.02 | 0.2983 | 0.3172 | 1067 |
| Example 2 | 18.13 | 0.2984 | 0.3174 | 1137 |
| Example 3 | 18.63 | 0.2985 | 0.3174 | 1098 |
| Example 4 | 19.14 | 0.2986 | 0.3176 | 1081 |
| Example 5 | 18.10 | 0.2980 | 0.3170 | 1159 |
| Example 6 | 17.96 | 0.2983 | 0.3172 | 1212 |
| Example 7 | 17.48 | 0.2980 | 0.3166 | 1100 |
| Example 8 | 16.91 | 0.2976 | 0.3159 | 1038 |
| Example 9 | 17.68 | 0.2977 | 0.3162 | 1109 |
| Example 10 | 18.14 | 0.2986 | 0.3176 | 1060 |
| Example 11 | 18.24 | 0.2984 | 0.3174 | 1172 |
| Example 12 | 18.07 | 0.2979 | 0.3166 | 1129 |
| Example 13 | 18.42 | 0.2984 | 0.3172 | 1125 |
| Example 14 | 18.85 | 0.2979 | 0.3165 | 1099 |
| Example 15 | 18.33 | 0.2989 | 0.3177 | 1118 |
| Example 16 | 18.59 | 0.2987 | 0.3177 | 1107 |

For each of the samples, the chromaticity coordinates (x,y), the luminance (Y), and the retroreflectivity at an observation angle of 0.2°, and entrance angle at −4°, were taken in the three circular outlined areas for each of the coated metallized white Euro CT base sheets and averaged as provided in Tables 4 and 5. Table 4 shows the results for samples coated with pigment colors.

TABLE 4

| | Rod Size | Pigment % Dry | Pigment | Thickness Microns | Y | Color Coordinates x | y | .2-4 CD | .2/−4 ΔY | ΔCD |
|---|---|---|---|---|---|---|---|---|---|---|
| Comp. 1 | 38 | 0.400 | Orange | 18.5 | 16.99 | 0.3087 | 0.3210 | 1329 | −0.41 | 185 |
| Comp. 2 | 44 | 0.400 | Orange | 26.2 | 18.23 | 0.3100 | 0.3216 | 1118 | −1.14 | 115 |
| Comp. 3 | 50 | 0.400 | Orange | 26.2 | 17.04 | 0.3125 | 0.3221 | 1267 | −0.97 | 164 |
| Comp. 4 | 56 | 0.400 | Orange | 32.3 | 17.81 | 0.3138 | 0.3229 | 1110 | −1.40 | −5 |
| Comp. 5 | 62 | 0.400 | Orange | 36.3 | 16.94 | 0.3154 | 0.3233 | 1253 | −1.44 | 74 |
| Comp. 6 | 72 | 0.400 | Orange | 40.6 | 16.82 | 0.3167 | 0.3236 | 1057 | −1.29 | −137 |
| Comp. 7 | 80 | 0.400 | Orange | 45.7 | 17.27 | 0.3196 | 0.3249 | 977 | −1.92 | −144 |
| Comp. 8 | 100 | 0.400 | Orange | 57.7 | 16.30 | 0.3267 | 0.3282 | 907 | −2.51 | −234 |
| Comp. 9 | 38 | 0.400 | LY | 18.5 | 18.16 | 0.3072 | 0.3350 | 1324 | −0.30 | 179 |
| Comp. 10 | 44 | 0.400 | LY | 22.9 | 18.16 | 0.3080 | 0.3374 | 1246 | −0.30 | 156 |
| Comp. 11 | 50 | 0.400 | LY | 28.7 | 17.98 | 0.3099 | 0.3412 | 1382 | −0.11 | 241 |
| Comp. 12 | 56 | 0.400 | LY | 27.2 | 18.50 | 0.3125 | 0.3449 | 1250 | −0.17 | 176 |
| Comp. 13 | 62 | 0.400 | LY | 35.6 | 19.14 | 0.3128 | 0.3461 | 1246 | 0.26 | 108 |
| Comp. 14 | 72 | 0.400 | LY | 35.6 | 19.98 | 0.3135 | 0.3742 | 999 | 0.19 | −129 |
| Comp. 15 | 80 | 0.400 | LY | 39.9 | 18.49 | 0.3157 | 0.3523 | 1096 | 0.50 | −158 |
| Comp. 16 | 100 | 0.400 | LY | 56.6 | 18.49 | 0.3180 | 0.3580 | 853 | 0.50 | −218 |

As can be seen in Table 4, the pigment colors moved the color readings of the retroreflective films into the LCD color box; however, the pigment colors reduced the luminance. For example, the orange pigment lowered the luminance factor on every sample tested. At the two lowest thicknesses tested, the orange pigment lowered the luminance factor by 0.41 and 1.14, respectively. The lemon yellow pigment also lowered the luminance factor for the thinner samples, but raised luminance on the samples above 35 microns in thickness. However, at a thickness above 35 microns, the retroreflectivity significantly dropped with only a minimal increase in luminance factor. At the two lowest thicknesses tested, the lemon yellow pigment lowered the luminance factor by 0.03 and 0.30, respectively. Additionally, although the pigment colors moved the color readings into the LCD color box, the chromaticity coordinates were not in ideal regions of the LCD color box.

For the Orange pigment samples the luminance factor trends lower (darker) and the reflectivity trends down. By comparison the Fluorescent Orange dye samples, the luminance factor trends higher (lighter) and although the reflectivity trends down, the loss trends to be less. For the Lemon Yellow pigment samples the luminance factor trends slowly higher (lighter) and the reflectivity trends down. By comparison the Fluorescent Yellow Green dye samples, the luminance factor trends higher (lighter) and although the reflectivity trends down, the loss trends to be less.

in the orange pigment color samples have a luminance factor that trends lower (e.g., darker) and the reflectivity also trends down. By comparison, for the fluorescent orange dye samples, the luminance factor trends higher (e.g., lighter) and the retroreflectivity loss is minimal. For the lemon yellow pigment samples, the luminance factor trends slowly higher (e.g., lighter) and the reflectivity trends down. By comparison, for the fluorescent yellow-green dye samples, the luminance factor trends higher (lighter) and the retroreflectivity loss is minimal. Surprisingly, the fluorescent orange and fluorescent yellow-green colors moved the color readings (chromaticity coordinates) into a more central area of the LCD color box, and resulted in a large increase in luminance factor with minimal loss in retroreflectivity, particularly for the fluorescent orange samples.

Figure 5:
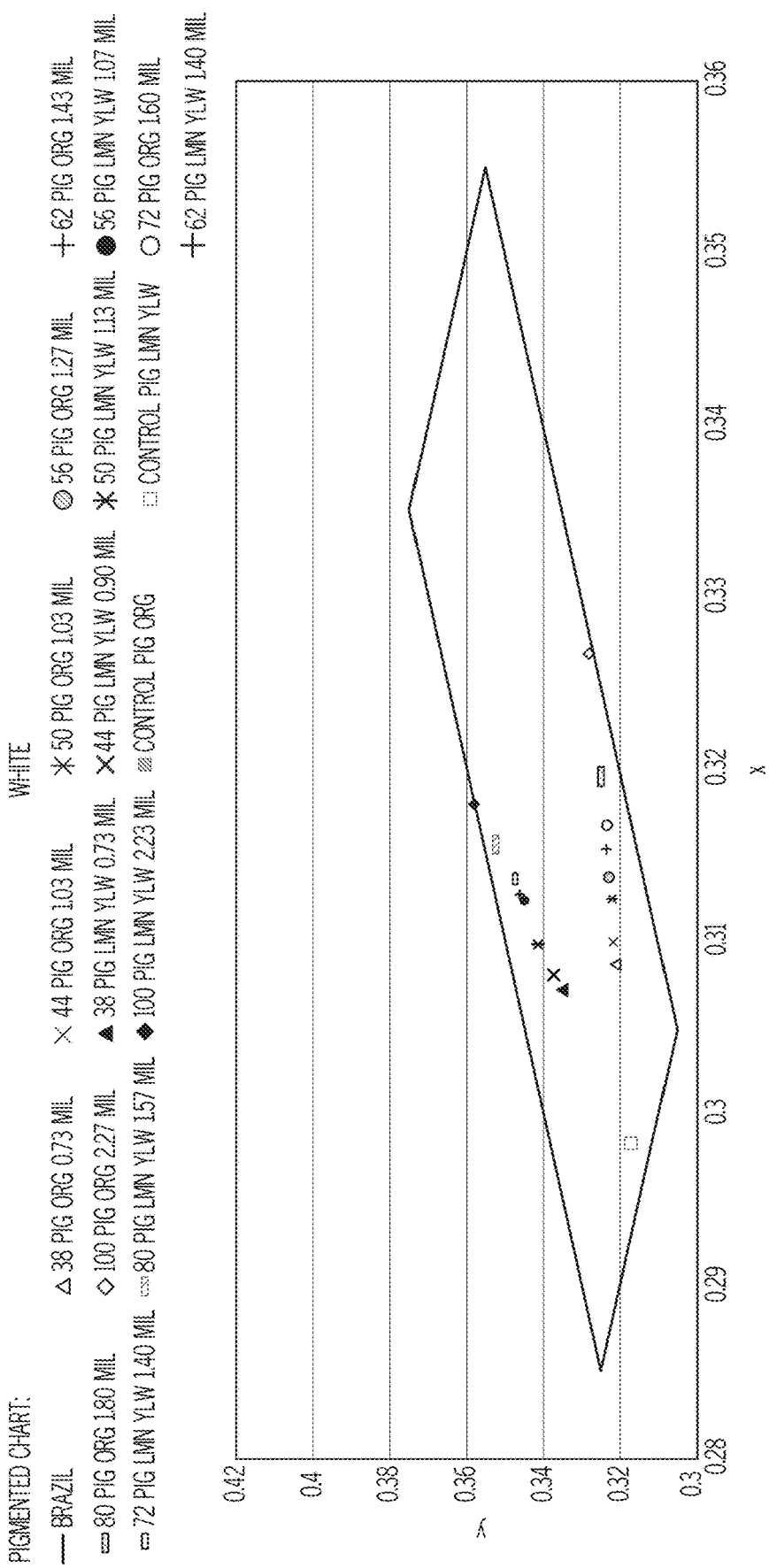
FIG. 5 is a CIE chromaticity diagram showing a preferred portion of the LCD color space, and color readings representing samples including pigment colors.
Figure 6:
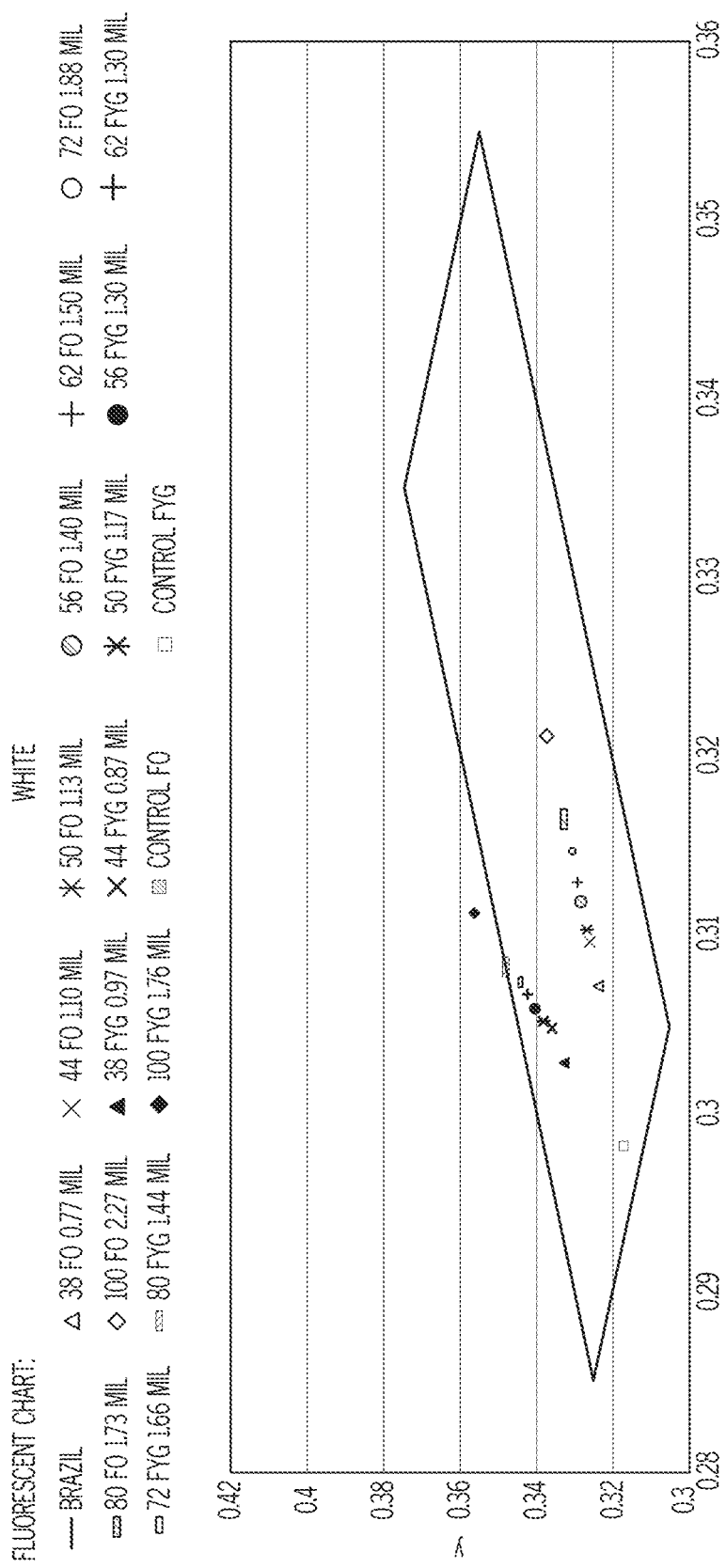
FIG. 6 is a CIE chromaticity diagram showing a preferred portion of the LCD color space, and color readings representing samples including fluorescent dye in accordance with embodiments of the present disclosure.

FIGS. 5 and 6 show the "x" and "y" values of Tables 4 and 5, respectively. The color coordinates ("x", "y") and luminance factor ("Y) values of the coated retroreflective sheeting are shown in Tables 2 and 3 and plotted in FIGS. 5 and 6, respectively. For comparison of purposes, the "x", "y" and "Y" values of control pigment colors and control fluorescent dyes also are shown. Especially interesting in this regard is the substantial shift in "x", "y" and "Y" values of retroreflective films including less than 0.05 wt. % fluorescent dye. This illustrates a considerable shift in the color coordinates displayed by the films including fluorescent dye described herein, while also increasing luminance. Surprisingly,

TABLE 5

| | Rod Size | Dry Dye (Wt. %) | Fluorescent Dye | Thickness Microns | Y | Color Coordinates | | .2-4 | | .2/-4 |
|---|---|---|---|---|---|---|---|---|---|---|
| | | | | | | x | y | CD | ΔY | ΔCD |
| Example 1 | 38 | 0.0048 | Fl Orange | 19.6 | 19.46 | 0.3072 | 0.3239 | 1247 | 0.44 | 180 |
| Example 2 | 44 | 0.0048 | Fl Orange | 27.9 | 19.04 | 0.3097 | 0.3260 | 1331 | 0.91 | 194 |
| Example 3 | 50 | 0.0048 | Fl Orange | 28.7 | 19.58 | 0.3103 | 0.3268 | 1211 | 0.95 | 113 |
| Example 4 | 56 | 0.0048 | Fl Orange | 35.6 | 19.64 | 0.3119 | 0.3285 | 1173 | 0.50 | 92 |
| Example 5 | 62 | 0.0048 | Fl Orange | 38.1 | 19.00 | 0.3130 | 0.3295 | 1234 | 0.91 | 75 |
| Example 6 | 72 | 0.0048 | Fl Orange | 42.7 | 19.43 | 0.3146 | 0.3307 | 1302 | 1.47 | 89 |
| Example 7 | 80 | 0.0048 | Fl Orange | 43.2 | 19.18 | 0.3166 | 0.3327 | 944 | 1.70 | -156 |
| Example 8 | 100 | 0.0048 | Fl Orange | 57.7 | 19.27 | 0.3211 | 0.3374 | 820 | 2.35 | -218 |
| Example 9 | 38 | 0.0048 | FYG | 24.6 | 17.97 | 0.3029 | 0.3328 | 1190 | 0.30 | 81 |
| Example 10 | 44 | 0.0048 | FYG | 22.1 | 18.84 | 0.3048 | 0.3360 | 1247 | 0.70 | 187 |
| Example 11 | 50 | 0.0048 | FYG | 29.7 | 18.95 | 0.3051 | 0.3379 | 1332 | 0.71 | 160 |
| Example 12 | 56 | 0.0048 | FYG | 33.0 | 19.48 | 0.3060 | 0.3406 | 1249 | 1.41 | 120 |
| Example 13 | 62 | 0.0048 | FYG | 33.0 | 19.66 | 0.3068 | 0.3424 | 1151 | 1.24 | 26 |
| Example 14 | 72 | 0.0048 | FYG | 42.2 | 20.51 | 0.3074 | 0.3447 | 1124 | 1.66 | 25 |
| Example 15 | 80 | 0.0048 | FYG | 36.6 | 19.77 | 0.3085 | 0.3479 | 1064 | 1.44 | -54 |
| Example 16 | 100 | 0.0048 | FYG | 44.7 | 20.35 | 0.3113 | 0.3563 | 909 | 1.76 | -198 |

Table 5 shows that coating formulations including small amounts of fluorescent dye applied on the metallized white Euro CT base moved the color readings substantially into the LCD color box and improved luminance, while maintaining or improving retroreflectivity. It was surprisingly found that coating formulations including less than 0.05 wt. % of fluorescent dye shifted the color of the articles into the LCD color box and improved luminance. Specifically, formulations including fluorescent orange and fluorescent yellow-green increased the luminance factor on every sample tested. For example, the fluorescent orange used in Examples 1 and 5 has color readings within a central region the LCD color box and, even at the two lowest thickness tested, increased the luminance factor by 0.44 and by 0.91, respectively. The fluorescent yellow-green moved out of the color box at the highest thickness tested, but at the lowest two thicknesses tested, increased the luminance factor by 0.30 and 0.70, respectively.

From the comparison charts showing the change in luminance and retroreflectivity in Tables 4 and 5, it is evident that including the aforementioned amounts of fluorescent dye also maintained the white appearance of metallized white articles.

The following embodiments are contemplated. All combinations of features and embodiment are contemplated.

Embodiment 1: A retroreflective film comprising: a prismatic layer having a plurality of retroreflective prism elements; a reflective layer comprising a metal coating conforming to the prismatic layer so that the film retroreflects light; and one or more layers above the reflective layer; wherein the prismatic layer or the one or more layers above the reflective layer comprises a fluorescent dye from 0.0001 wt. % to 0.05 wt. %, based on the total weight of the layer.

Embodiment 2: An embodiment of embodiment 1, wherein the prismatic layer or the one or more layers above the reflective layer comprises the fluorescent dye from about 0.001 wt. % to 0.01 wt. %, based on the total weight of the layer.

Embodiment 3: An embodiment of embodiments 1 or 2, wherein prismatic layer and the one or more layers above the reflective layer are in an optical path of the film.

Embodiment 4: An embodiment of embodiments 1-3, further comprising one or more layers below the reflective layer.

Embodiment 5: An embodiment of embodiments 1-4, wherein the one or more layers below the reflective layer is not in the optical path.

Embodiment 6: An embodiment of embodiments 1-5, wherein the retroreflective film comprises an optional protective layer, the prismatic layer, the reflective layer, an adhesive layer, and a liner.

Embodiment 7: An embodiment of embodiments 6, wherein the retroreflective film is sequentially arranged from top to bottom comprising the optional protective layer, the prismatic layer, the reflective layer, the adhesive layer, and the liner.

Embodiment 8: An embodiment of embodiments 6 or 7, wherein the protective layer is transparent.

Embodiment 9: An embodiment of embodiments 6-8, wherein the protective layer comprises the fluorescent dye.

Embodiment 10: An embodiment of embodiments 6-9, wherein the protective layer comprises a UV absorbing layer.

Embodiment 11: An embodiment of embodiments 1-10, wherein the reflective layer comprises one or more aluminum, chrome, or silver.

Embodiment 12: An embodiment of embodiments 1-11, wherein the reflective layer is opaque.

Embodiment 13: An embodiment of embodiments 1-12, wherein the film has a luminance factor of at least 15 as defined by the CIE 1931 Standard Colorimetric System.

Embodiment 14: An embodiment of embodiments 1-13, wherein the retroreflective film has an average retroreflectivity of at least 350 cd·lx$^{-1}$·m$^{-2}$ when tested according to ASTM E 810-03 (2013).

Embodiment 15: An embodiment of embodiments 1-14, wherein the retroreflective film has chromaticity coordinates (x,y) within the area defined by the following coordinates: (0.305, 0.315), (0.335, 0.345), (0.325, 0.355) and (0.295, 0.325)

Embodiment 16: An embodiment of embodiments 1-15, wherein the one or more layers above the reflective layer is a coating layer comprising the fluorescent dye.

Embodiment 17: An embodiment of embodiment 16, wherein the coating layer is sandwiched between the prismatic layer and the reflective layer.

Embodiment 18: A retroreflective film comprising: a prismatic layer having a plurality of retroreflective prism elements; a reflective layer conforming to the prismatic layer so that the film retroreflects light; one or more layers above the reflective layer; wherein the one or more layers above the reflective layer comprises a coating composition comprising: an organic solvent from 40 wt. % to 60 wt. %, based on the total weight of the composition; an aromatic hydrocarbon from 10 wt. % to 40 wt. %, based on the total weight of the composition; an impact-modified acrylic from 10 wt. % to 40 wt. %, based on the total weight of the composition; and a fluorescent dye package comprising a fluorescent dye, wherein the fluorescent dye is present from 0.0001 wt. % to 0.05 wt. %, based on the total dry weight of the composition.

Embodiment 19: An embodiment of embodiment 18, wherein the fluorescent dye package comprises: an impact-modified acrylic and a UV additive from 90 wt. % to 99.8 wt. %, based on the total weight of the dye package; and the fluorescent dye from 0.50 wt. % to 3 wt. %, based on the total weight of the dye package.

Embodiment 20: An embodiment of embodiment 19, wherein the fluorescent dye is fluorescent yellow-green dye, wherein the fluorescent yellow-green dye is provided in an amount from 1.0 wt. % to 1.5 wt. %, based on the total weight of the dye package.

Embodiment 21: An embodiment of embodiment 18, wherein the fluorescent dye comprises: an impact-modified acrylic from 80 wt. % to 98 wt. %, based on the total weight of the dye package; an impact-modified acrylic and a UV additive from 1 wt. % to 10 wt. %, based on the total weight of the dye package; and the fluorescent dye from 0.01 wt. % to 1 wt. %, based on the total weight of the dye package.

Embodiment 22: An embodiment of embodiment 21, wherein the fluorescent dye is fluorescent orange dye, wherein the fluorescent orange dye is provided in an amount from 0.10 wt. % to 0.20 wt. %, based on the total weight of the dye package.

Embodiment 23: An embodiment of embodiments 18-22, wherein the coating composition is applied to the prismatic layer of the retroreflective film.

Embodiment 24: An embodiment of embodiments 18-23, wherein a luminance factor of the retroreflective films is at least 15 as defined by the CIE 1931 Standard Colorimetric System.

Embodiment 25: An embodiment of embodiments 18-24, wherein an average retroreflectivity of the retroreflective film is at least 350 cd·lx$^{-1}$·m$^{-2}$ when tested according to ASTM E 810-03 (2013).

Embodiment 26: An embodiment of embodiments 18-25, wherein the chromaticity coordinates (x,y) of the retroreflective film is within the area defined by the following coordinates: (0.305, 0.315), (0.335, 0.345), (0.325, 0.355) and (0.295, 0.325).

Embodiment 27: An embodiment of embodiments 18-25, wherein the coating composition forms a layer having a thickness from 10 microns to 80 microns.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the invention.

We claim:

1. A retroreflective film comprising:
a prismatic layer having a plurality of retroreflective prism elements;
a reflective layer comprising a metal coating conforming to the prismatic layer so that the film retroreflects light; and
one or more layers above the reflective layer;
wherein thickness of the reflective layer is smaller than the prismatic layer;

wherein the prismatic layer or the one or more layers above the reflective layer comprises a fluorescent dye from 0.0001 wt. % to 0.05 wt. %, based on the total weight of the layer;

wherein the retroreflective film have a color reading that is situated in the color space with a color reading within CIE chromaticity coordinates (x,y) (0.305, 0.315), (0.335, 0.345), (0.325, 0.355) and (0.295, 0.325).

2. The retroreflective film of claim 1, wherein the prismatic layer or the one or more layers above the reflective layer comprises the fluorescent dye from about 0.001 wt. % to 0.01 wt. %, based on the total weight of the layer.

3. The retroreflective film of claim 1, wherein prismatic layer and the one or more layers above the reflective layer are in an optical path of the film.

4. The retroreflective film of claim 1, further comprising one or more layers below the reflective layer.

5. The retroreflective film of claim 1, wherein the one or more layers below the reflective layer is not in the optical path.

6. The retroreflective film of claim 1, wherein the retroreflective film comprises an optional protective layer, the prismatic layer, the reflective layer, an adhesive layer, and a liner.

7. The retroreflective film of claim 6, wherein the retroreflective film is sequentially arranged from top to bottom comprising the optional protective layer, the prismatic layer, the reflective layer, the adhesive layer, and the liner.

8. The retroreflective film of claim 6, wherein the protective layer is transparent.

9. The retroreflective film of claim 6, wherein the protective layer comprises the fluorescent dye.

10. The retroreflective film of claim 6, wherein the protective layer comprises a UV absorbing layer.

11. The retroreflective film of claim 1, wherein the reflective layer comprises one or more aluminum, chrome, or silver.

12. The retroreflective film of claim 1, wherein the reflective layer is opaque.

13. The retroreflective film of claim 1, wherein the film has a luminance factor of at least 15 as defined by the CIE 1931 Standard Colorimetric System.

14. The retroreflective film of claim 1, wherein the retroreflective film has an average retroreflectivity of at least 350 cd·lx$^{-1}$·m$^{-2}$ when tested according to ASTM E 810-03 (2013).

15. The retroreflective film of claim 1, wherein the one or more layers above the reflective layer is a coating layer comprising the fluorescent dye.

16. The retroreflective film of claim 15, wherein the coating layer is sandwiched between the prismatic layer and the reflective layer.

17. A retroreflective film comprising:
a prismatic layer having a plurality of retroreflective prism elements;
a reflective layer conforming to the prismatic layer so that the film retroreflects light;
one or more layers above the reflective layer;
wherein thickness of the reflective layer is smaller than the prismatic layer;
wherein the one or more layers above the reflective layer comprises a coating composition comprising:
an organic solvent from 40 wt. % to 60 wt. %, based on the total weight of the composition;
an aromatic hydrocarbon from 10 wt. % to 40 wt. %, based on the total weight of the composition;
an impact-modified acrylic from 10 wt. % to 40 wt. %, based on the total weight of the composition; and
a fluorescent dye package comprising a fluorescent dye, wherein the fluorescent dye is present from 0.0001 wt. % to 0.05 wt. %, based on the total dry weight of the composition;
wherein the retroreflective film have a color reading that is situated in the color space with a color reading within CIE chromaticity coordinates (x,y) (0.305, 0.315), (0.335, 0.345), (0.325, 0.355) and (0.295, 0.325).

18. The retroreflective film of claim 17, wherein the fluorescent dye package comprises:
an impact-modified acrylic and a UV additive from 90 wt. % to 99.8 wt. %, based on the total weight of the dye package; and
the fluorescent dye from 0.50 wt. % to 3 wt. %, based on the total weight of the dye package.

19. The retroreflective film of claim 18, wherein the fluorescent dye is fluorescent yellow-green dye, wherein the fluorescent yellow-green dye is provided in an amount from 1.0 wt. % to 1.5 wt. %, based on the total weight of the dye package.

20. The retroreflective film of claim 17, wherein the fluorescent dye comprises:
an impact-modified acrylic from 80 wt. % to 98 wt. %, based on the total weight of the dye package;
an impact-modified acrylic and a UV additive from 1 wt. % to 10 wt. %, based on the total weight of the dye package; and
the fluorescent dye from 0.01 wt. % to 1 wt. %, based on the total weight of the dye package.

21. The retroreflective film of claim 20, wherein the fluorescent dye is fluorescent orange dye, wherein the fluorescent orange dye is provided in an amount from 0.10 wt. % to 0.20 wt. %, based on the total weight of the dye package.

22. The retroreflective film of claim 17, wherein the coating composition is applied to the prismatic layer of the retroreflective film.

23. The retroreflective film of claim 17, wherein a luminance factor of the retroreflective films is at least 15 as defined by the CIE 1931 Standard Colorimetric System.

24. The retroreflective film of claim 17, wherein an average retroreflectivity of the retroreflective film is at least 350 cd·lx$^{-1}$·m$^{-2}$ when tested according to ASTM E 810-03 (2013).

25. The retroreflective film of claim 17, wherein the coating composition forms a layer having a thickness from 10 microns to 80 microns.

* * * * *